United States Patent [19]

Inuzuka et al.

[11] Patent Number: 5,639,704

[45] Date of Patent: Jun. 17, 1997

[54] CERAMIC INCLUDING ALUMINA AND A COMPLEX OXIDE

[75] Inventors: Tsutomu Inuzuka; Shinji Harada; Yuji Mido; Tadashi Tojyo; Satoshi Tomioka, all of Osaka, Japan

[73] Assignee: Matsushita Electric Industrial Co., Ltd., Osaka, Japan

[21] Appl. No.: 386,052

[22] Filed: Feb. 7, 1995

[30] Foreign Application Priority Data

| Feb. 14, 1994 | [JP] | Japan | 6-017173 |
| Sep. 21, 1994 | [JP] | Japan | 6-226576 |
| Oct. 19, 1994 | [JP] | Japan | 6-253392 |
| Dec. 8, 1994 | [JP] | Japan | 6-304631 |

[51] Int. Cl.$^6$ ................................. C04B 35/117
[52] U.S. Cl. ................ 501/127; 501/119; 501/120; 501/125; 501/128
[58] Field of Search .................. 501/119, 120, 501/125, 127, 128

[56] References Cited

U.S. PATENT DOCUMENTS

| 4,483,944 | 11/1984 | Day et al. | 501/128 X |
| 4,528,275 | 7/1985 | Hodge | 501/119 X |
| 4,855,259 | 8/1989 | Claussen et al. | 501/119 X |
| 4,960,738 | 10/1990 | Hori et al. | 501/128 |
| 5,002,911 | 3/1991 | Matsumoto et al. | 501/127 X |
| 5,045,514 | 9/1991 | Ismail et al. | 501/119 |
| 5,387,268 | 2/1995 | Hiraiwa et al. | 501/120 X |
| 5,482,907 | 1/1996 | Juan et al. | 501/127 X |

FOREIGN PATENT DOCUMENTS

| 0230959 | 5/1987 | European Pat. Off. . |
| 0331160 | 6/1989 | European Pat. Off. . |
| 0331160 | 9/1989 | European Pat. Off. . |
| 0623938 | 9/1994 | European Pat. Off. . |
| 2143775 | 9/1973 | France . |
| 3616578 | 11/1986 | Germany . |
| 59-145703 | 12/1984 | Japan . |
| 1317157 | 12/1989 | Japan . |
| 4-367557 | 5/1993 | Japan . |
| 2234502 | 6/1991 | United Kingdom . |
| 9118846 | 12/1991 | WIPO . |
| 9402431 | 3/1994 | WIPO . |

*Primary Examiner*—Karl Group
*Attorney, Agent, or Firm*—McDermott, Will & Emery

[57] ABSTRACT

The present invention relates to ceramics and a method for making ceramics having very little dimensional change after sintering and high dimensional accuracies, so that the characteristics of inorganic functional material are fully maintained and utilized. The ceramics of the present invention comprise grains of inorganic functional material and grains of complex oxide. The pores existing between said grains of inorganic functional material are filled with said grains of complex oxide produced by a sintering reaction between an oxidized metal and an inorganic compound.

9 Claims, 1 Drawing Sheet

CERAMIC INCLUDING ALUMINA AND A COMPLEX OXIDE

BACKGROUND OF THE INVENTION

The present invention relates to ceramics used for making various electronic components and a method for manufacturing ceramics.

Conventional ceramics are manufactured by mixing an organic binder with a powder of conventional ceramics material, pressing the mixture into a mold, and then sintering the mold at a high temperature. However, conventional ceramics manufactured by conventional methods are susceptible to relatively large volumetric shrinkage during the high temperature sintering step, thereby making it very difficult to obtain ceramics having precise and accurate dimensions. As a result, conventional sintered ceramics must undergo time-consuming cutting or grinding steps to obtain a particular shape and dimension. However, because of the high hardness of sintered ceramics, such cutting or grinding steps involve expensive machining costs.

Japanese Laid-Open Patent, Hei 1-317157 discloses ceramics having a precise shape and dimension. The disclosed ceramics are produced without the problem of volumetric shrinkage, thereby obviating the need for grinding or cutting. The disclosed ceramics are manufactured using a so-called reactive sintering method wherein alumina powder, which possesses dual functions of high electrical insulation and thermal conductivity, is mixed with titanium powder. The mixture is press-molded into a metal die and then sintered in a nitrogen atmosphere. The structure of the disclosed ceramics is characterized by a reactively sintered body, in which the alumina powder is reactively combined with the titanium nitride powder that is derived from the metal titanium powder during the sintering step. Volumetric shrinkage during the sintering step is minimized because the metal titanium powder reacts with nitrogen gas and expands. Thus, an alumina-system ceramics of low dielectric constant can be obtained when it is combined with titanium nitride, which is a material of low dielectric constant.

During the disclosed manufacturing process, however, nitrogen gas reacting with the metal powder must be externally supplied into the mold via pores located in the mold. As a result, the disclosed reactively-sintered ceramics inherently exhibit low mechanical strength or considerably lessened inorganic functional material characteristics caused by the numerous pores that are produced within the ceramics at a volume ratio of as high as 15 to 20%. Further, sintering within a nitrogen atmosphere requires strict regulation of the nitrogen density and the sintering temperature, which is disadvantageous from the stand point of manufacturing cost.

It is well known that the highest function of ceramics can be obtained when the porosity of sintered ceramics is at a minimum. Further, ceramics having a high thermal conductivity can be obtained when the ceramics is only made of alumina. Ceramics having a highest magnetic saturation can be obtained when the ceramics is made of magnetic material only. Ceramics having a high dielectric constant can be obtained when it is made of a dielectric material only. In addition, ceramics having high thermal conductivity can be obtained using conventional manufacturing methods wherein metal particles are transformed into metal nitride particles by the disadvantageously expensive reactive-sintering method in a nitrogen atmosphere.

SUMMARY OF THE INVENTION

The object of the present invention is to provide ceramics that possess maximal inorganic material functional characteristics, complex oxide functions, a minimum porosity and precise dimensions and that are produced using a sintering process.

The ceramics of the present invention comprise:

(a) grains of inorganic functional material, and (b) grains of complex oxide distributed among said grains of inorganic functional material, said grains of complex oxide being produced by a chemical reaction at the sintering of a mixture of at least two types of particles selected from the group consisting of at least one type of metal particle and at least one type of inorganic compound particle.

A manufacturing method for making ceramics of the present invention comprises:

(a) mixing at least one type of metal particle and at least one type of inorganic compound particle to form a mixture;

(b) molding said mixture into a desired shape to form a mold; and (c) sintering said mold under an oxygen gas atmosphere.

In step (c) above, grains of inorganic functional material are formed from the particle of said inorganic functional material. The complex oxide is chemically formed from a mixture of at least one type of said metal particles and at least one type of said inorganic compound particle. The complex oxide is then formed between the grains of said inorganic functional material.

According to the present invention, a mixture of at least two types of metal particles, or a mixture of metal particles and inorganic compound particles, is transformed into a metal oxide by a chemical reaction between the metal particle and the externally supplied oxygen gas. Because the transforming process from metal to metal oxide is inevitably accompanied by volumetric expansion, the gaps located in the grains of the mold become gradually filled with the metal oxide grains, thereby forming complex metal oxides when at least two types of metal particles are present. When the particle of inorganic compound is present, the complex oxide is produced by a chemical reaction between the particles of said metal oxide and said inorganic compound. The gaps between the grains of said inorganic functional material become filled with the grains of said complex oxide. As a result, both the volumetric shrinkage of the mold caused by the sintering process and the porosity of ceramics are substantially minimized, thereby maintaining the essential characteristics of the inorganic functional material and attaining a highly precise and dimensionally accurate shape for the mold. Thus, the functions of complex compounds are given to the mold in addition to the above-mentioned characteristics and inherent functions of the inorganic functional material.

DETAILED DESCRIPTION OF THE INVENTION

The ceramics of the present invention and its manufacturing method are now explained below by referring to the drawings.

Figure 1:
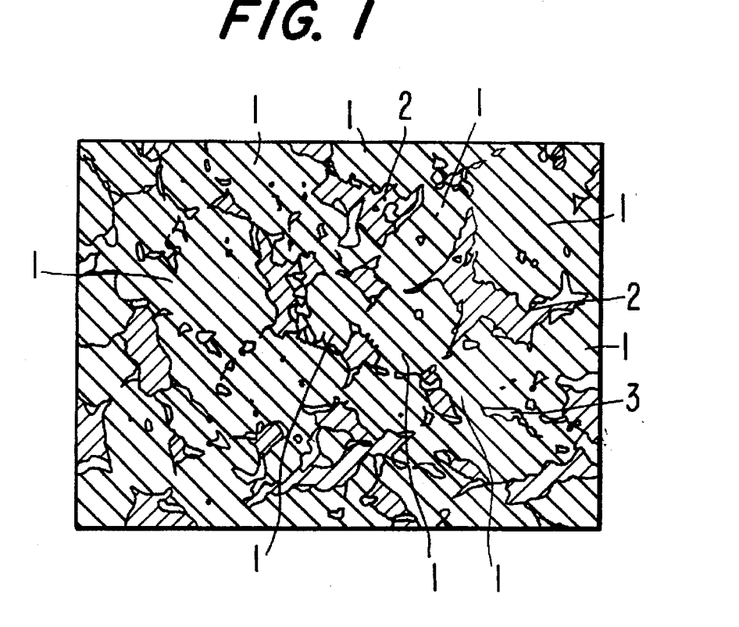
FIG. 1 shows an enlarged cross-section of the planar-shaped ceramics according to the present invention showing its internal structure.

FIG. 1 shows an enlarged cross-section of the planar-shaped ceramics according to the present invention showing its internal structure. The ceramics contains innumerable grains 1 of inorganic functional material and innumerable grains 2 of complex oxide distributed among said innumerable grains of inorganic functional material.

Figure 2:
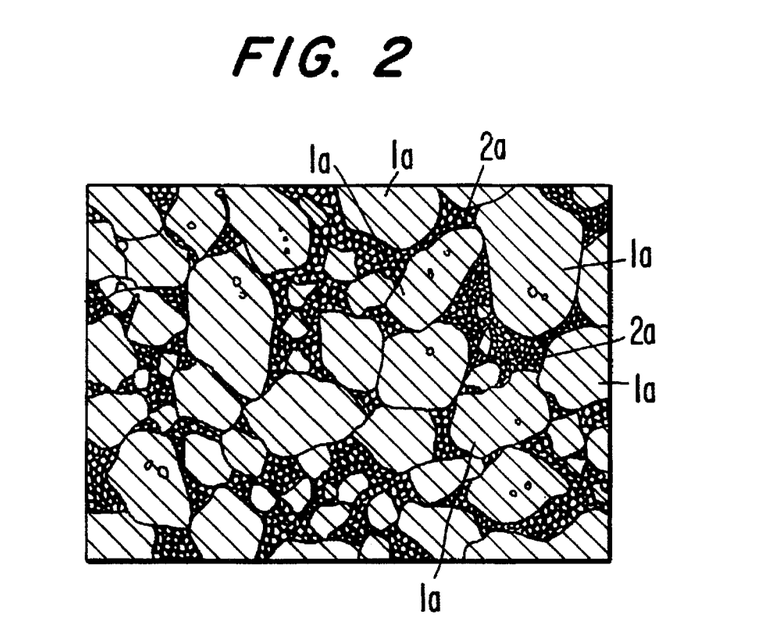
FIG. 2 shows an enlarged cross-section of an embodiment of the present inventions showing the internal structure of unsintered planar-shaped ceramics.

As shown in FIG. 2, such a structure is obtained by mixing the grains 1a of an inorganic functional material with at least two types of metal particles 2a or a mixture 2a of at least one type of metal particle and at least one type of particle of inorganic compound, and then sintering the mixture. By this, grain 2 of complex oxide are formed between the grains 1 of inorganic functional material. However, in this case, pores 3 are formed and remained within the ceramics. Moreover, the manufacturing method of the present invention comprises a first step by which particle 1a of inorganic functional material is mixed with mixture 2a of at least two types of metal particles, or a mixture of at least one type of inorganic compound particle and at least one type of metal particle to prepare a complex oxide 2; a second step by which the mixture obtained by the first step is molded, and a third step by which the mold obtained by the second process is sintered, thereby oxidizing and chemically reacting the mold in an elevated temperature.

In the second step, an extrusion molding step, or pressure molding step, which is more popularly known, may be used after the molding particles are formed, depending on the shape of mold. This embodiment of the invention is characterized by a mixture of at least two types of metal particles or a mixture 2a of at least one type of metal particle and at least one type of inorganic compound particle among grains 1a of inorganic functional material forming grains 2 of complex oxide, produced by the successive sintering of this mixture. The volumetric shrinkage between the grains 1 or inorganic functional material is minimized because of the counter expansion of the mixed metal particles as these are combined with the oxygen atoms contained in the environmental atmosphere during the third step of the employed manufacturing method. Furthermore, according to the present invention, not only is the shrinkage between the grains 1 of inorganic functional material suppressed to a minimum, but, at the same time, the pores allowing the passage of oxygen gas are filled so that the porosity of the resultant ceramics is further reduced because of the volumetric expansion of the complex oxide brought by a chemical reaction taking place between the oxidized metal particles and the grains of inorganic functional material.

Though the types of inorganic functional material usable in the present invention are not particularly limited, preferred types should possess a high thermal conductivity, a low dielectric constant and high electrical insulation properties. Examples of inorganic functional material include, but are not limited to, alumina, mullite system compound, cordierite system compound or sapphirine system compound may be employed. Whereas the employment of metal particle showing a volumetric expansion is desirable, the metals, such as Al, Si, Ti, Mn, Fe, Co, Mo, W, Cr, Ni, Cu, or Zn are desirable, may be used.

Moreover, since the employment of inorganic compound particles showing a volumetric expansion when it is chemically combined with oxidized metal particles yielding a complex oxide is desired, the use of any of $LiO_2$, $B_2O_3$, $MgO$, $MgCO_3$, $Al_2O_3$, $SiO_2$, $SiO$, $CaO$, $CaCO_3$, $TiO$, $Ti_2O_3$, $TiO_2$, $V_2O_3$, $V_2O_4$, $V_2O_5$, $MnO$, $MnO_2$, $FeO$, $Fe_2O_3$, $Fe_3O_4$, $CoO$, $Co_3O_4$, $NiO$, $NiO_2$, $CuO$, $Cu_2O$, $ZnO$, $SrO$, $SrCO_3$, $NbO$, $NbO_2$, $Nb_2O_3$, $BaO$, $BaO_2$, $Ta_2O_5$, $GEO_2$, $Ga_2O_3$, $Y_2O_3$, or $Ag_2O$ is possible, but not limited thereto.

By selecting more than two types of metal particles, the suitable functional characteristics of complex oxide can be additionally endowed to the characteristics of the inorganic functional material. For example, the characteristics of low dielectric constant of $Si_2Al_6O_{13}$ mullite can be added to the characteristic of the inorganic functional material by forming a complex oxide using Al and Si atoms.

Moreover, by selecting at least one type of metal particle out of the above-mentioned metal particles and at least one type of inorganic compound particle out of the above-mentioned inorganic compound particles, the functional characteristics of complex compound can be added to the characteristics of inorganic functional material. For instance, by selecting Al and Si particles as the metal particle, and selecting MgO particles as the inorganic compound particle, a $Mg_2Al_4SiO_{10}$ system sapphirine complex compound can be produced. Moreover, although this complex oxide can be sintered with particles 1a of inorganic functional material, there is a case where plural types of grains 1 of inorganic functional materials are sintered together as shown in FIG. 1.

However, since a mixture of at least two types of metal particles or a mixture 2a of one type of metal particle and one type of inorganic compound particle is disposed in the relatively large gaps existing between the grains 1 of inorganic functional material as shown in FIG. 2, grains 1 of inorganic functional material and grains 2 of complex oxide are sintered together. As a result, the shrinkage of this mixture can be prevented or substantially minimized. Moreover, even if several types of complex oxides were partly produced by mutual chemical reactions between more than one type of metal particle and inorganic compound particle contained in a mixture, no substantial effects on the characteristics would be produced.

Embodiments of the invention are now explained below.

EMBODIMENT-1

The ceramics of Embodiment-1 consists of innumerable grains 1 of alumina employed as an inorganic functional material and innumerable grains 2 of $Mg_2Al_4SiO_{10}$ system sapphirine complex oxide disposed between alumina grains 1. The grain 2 of $Mg_2Al_4SiO_{10}$ system sapphirine complex oxide can be obtained by mixing Al, Si, and MgO particles into alumina particle and by applying a sintering process thereto, and this is named as Sample-1.

The manufacturing process of Sample-1 shown in Embodiment-1 consists of a first process by which alumina particle employed as particle 1a of inorganic functional material is mixed into a mixture of at least two types of metal particles, or a mixture of Al, Si, and MgO particles mixed with alumina particles at a weight ratio of 30 to 100, employed as a mixture 2a of at least one type of metal particle and one type of inorganic compound; and a second process by which butylal resin, methyl-ethyl ketone, N-butyl acetate are added to the mixture obtained by the first process and kneaded to form a slurry of this and to form a green sheet by using a doctor-blade, and a third process by which the green-sheet is sintered in an electric furnace applying a temperature of 1600° C. causing an oxidation and chemical reaction of the green-sheet.

The characteristics of ceramics named Sample-2 which is an embodiment of the invention, prepared by replacing the Si with $SiO_2$ particle, the characteristics of ceramics of the same named Sample-3 in which MgO is replaced by $MgCO_3$ particle, and the characteristics of ceramics named Reference-1 made of Al particle only are comparatively shown in Table 1.

TABLE 1

|  | Dimensional change (%) | Porosity (%) | Thermal conductivity (W/k · m) | Mechanical strength (Kgf/ cm$^2$) |
| --- | --- | --- | --- | --- |
| Sample-1 | 0.0 | 10 | 16 | 2600 |
| Sample-2 | 0.0 | 11 | 16 | 2580 |
| Sample-3 | 0.0 | 11 | 16 | 2540 |
| Ref-4 | 0.0 | 16 | 10 | 1800 |

As shown in Table 1, all of the dimensional changes of Samples-1, 2, and 3, and Reference-1 are extremely small. However, the porosity of Reference-1 is relatively larger and the thermal conductivity is lower because only Al particle is oxidized and no complex oxide is formed. On the other hand, the porosities of ceramics of Embodiment-1 are considerably smaller than that of Reference-1 due to the formation of Al oxide or the formation of $Mg_2Al_4SiO_{10}$ system sapphirine complex oxide, and Samples-1, -2, and -3 show that the dimensional changes of those are extremely small, the mechanical strengths are sufficiently high, and the thermal conductivities of these are sufficiently high also. Moreover, Samples-4 to -20 are various ceramics obtained by adding alumina particles to mixtures of Al and inorganic compound particles, and the respective characteristics of those are tabulated in Table 2.

TABLE 2

|  | Mixed particle (Wt %) | Complex oxide | Dimensional change | Porosity (%) | Mech. strength (Kgf/cm$^2$) |
| --- | --- | --- | --- | --- | --- |
| Sample-4 | Al(77.7) $B_2O_3$(22.3) | $B_4Al_{18}O_{33}$ | 0.0 | 9 | 2520 |
| Sample-5 | Al(69.7) $B_2O_3$(32.1) | $BaAl_2O_{19}$ | 0.1 | 10 | 2400 |
| Sample-6 | Al(18.8) $Bi_2O_3$(81.2) | $Bi_2Al_4O_9$ | 0.0 | 10 | 2390 |
| Sample-7 | Al(65.8) CaO(31.2) | $CaAl_4O_7$ | 0.0 | 8 | 2610 |
| Sample-8 | Al(54.9) Cu(54.1) | $CuAl_2O_4$ | 0.1 | 11 | 2350 |
| Sample-9 | Al(47.8) Co(52.2) | $CoAl_2O_4$ | 0.1 | 9 | 2420 |
| Sample-10 | Al(49.2) Fe(50.8) | $FeAl_2O_4$ | 0.0 | 10 | 2350 |
| Sample-11 | Al(34.1) $GeO_2$(65.9) | $GeAl_2O_5$ | 0.1 | 10 | 2520 |
| Sample-12 | Al(90.0) $LiO_2$(10.0) | $LiAl_5O_8$ | 0.1 | 9 | 2440 |
| Sample-13 | Al(49.6) Mn(50.4) | $MnAl_2O_4$ | 0.0 | 9 | 2300 |
| Sample-14 | Al(11.1) Mo(88.9) | $Al_2(MnO_4)$ | 0.0 | 8 | 2310 |
| Sample-15 | Al(16.9) $Nb_2O_3$(83.1) | $NbAlO_4$ | 0.1 | 11 | 2320 |
| Sample-16 | Al(65.8) Si(31.2) | $Al_2SiO_5$ | 0.0 | 9 | 2540 |
| Sample-17 | Al(34.3) SrO(12.7) | $Sr_3Al_2O_6$ | 0.0 | 8 | 2330 |
| Sample-18 | Al(10.9) $Ta_2O_5$(89.1) | $TaAlO_4$ | 0.0 | 12 | 2300 |
| Sample-19 | Al(53.0) Ti(47.0) | $TiAl_2O_5$ | 0.0 | 9 | 2450 |
| Sample-20 | Al(8.9) W(91.1) | $Al_2(WO_4)_3$ | 0.1 | 8 | 2320 |

As shown in Table 2, despite of small dimensional changes of the invented ceramics of various material systems, the porosities of these having sufficiently high mechanical strengths are considerably smaller than that of Reference-1 obtained by the conventional reactive sintering method.

EMBODIMENT-2

A second embodiment of the invention is explained below. Since the manufacturing method of this invented ceramics is almost same as that employed to prepare Embodiment-1, it is omitted here.

In here, Al and Mg particles are mixed at a weight ratio of 53.3 to 42.7 as a mixture of metal and inorganic particles in order to prepare a $MgAl_2O_4$ system spinel complex oxide. After mixing this with alumina particle at a weight ratio of 30:100, the mixture is sintered at a temperature of 1600° C., and the characteristics including the thermal conductivity of the obtained ceramics or Sample 21 are shown in Table 3.

TABLE 3

|  | Dimensional change (%) | Porosity (%) | Thermal conductivity (W/k · m) |
| --- | --- | --- | --- |
| Sample-21 | 0.0 | 9 | 18 |
| Ref.-1 | 0.0 | 16 | 10 |

Ref.-1 in this case is a ceramics obtained by mixing only Al particle with alumina particle. As shown in Table-3, beside the extremely small dimensional changes of Sample 21 and Ref.-1, Sample-21 which is an alumina system ceramics having a high thermal conductivity resulted from its low porosity is obtained.

EMBODIMENT-3

A third embodiment of the invention is now explained below. Since the ceramics and its manufacturing method of the third embodiment are nearly identical as that of Embodiment-1, these are omitted here.

In this case, Al and Si particles are mixed at a weight ratio of 74.2:25.8 representing a mixture of two types of metal particles in order to prepare a $Si_2Al_6O_{13}$ system mullite complex oxide. After mixing this mixture with alumina particle at a weight ratio of 30:100, the mixture is sintered at a temperature of 1600° C.

The characteristics of this ceramics including the dielectric constant and the thermal conductivity of the obtained ceramics or Sample 22 are shown in Table 4.

TABLE 4

|  | Dimensional change (%) | Porosity (%) | Dielectric constant | Thermal conductivity (W/k · m) |
| --- | --- | --- | --- | --- |
| Sample-22 | −0.1 | 8 | 7.5 | 15 |
| Ref.-1 | 0.0 | 16 | 9.8 | 10 |

TABLE 4-continued

|  | Dimensional change (%) | Porosity (%) | Dielectric constant | Thermal conductivity (W/k · m) |
|---|---|---|---|---|
| Ref.-2 | 0.0 | 17 | 10.2 | 10 |
| Ref.-3 | −0.0 | 18 | 9.0 | 9 |

Ref.-2 and Ref.-3 in this case are the ceramics obtained by mixing only Si or Al particle to alumina particle. As shown in Table-4, all of the dimensional changes of Sample 22 and Refs.-1, 2, and 3, are very small. However, an alumina system ceramics such as Sample-22 having a lower dielectric constant and a higher thermal conductivity than those of References, has been obtained by forming a $Si_2Al_6O_{13}$ mullite system complex oxide such as Sample 22 which is a material of low porosity and low dielectric constant.

EMBODIMENT-4

A fourth embodiment of the invention is now explained below.

Since the ceramics and its manufacturing method of the fourth embodiment are nearly identical with those of Embodiment-1, those are omitted here.

In this case of the invention, MgO, Al, and Si particles are mixed at a weight ratio of 24.5:32.8:42.7 representing a mixture of metal particle and inorganic compound in order to prepare a $Mg_2Si_5Al_4O_{13}$ system cordierite complex oxide. After mixing this with alumina particle at a weight ratio of 30:100, the mixture is sintered at a temperature of 1430° C.

The characteristics including the coefficient of thermal expansion and the thermal conductivity of the obtained ceramics or Sample 23 are shown in Table 5.

TABLE 5

|  | Dimensional change (%) | Porosity (%) | Coef. of thermal expansion (x $10^6$/K) | Thermal conductivity (W/k · m) |
|---|---|---|---|---|
| Sample-23 | −0.1 | 7 | 4.2 | 15 |
| Ref.-1 | 0.0 | 16 | 7.0 | 10 |

As shown in Table 5, beside the extremely small dimensional changes of Sample 23 and Ref.-1, an alumina system ceramics such as Sample-23 having a relatively low thermal expansion and a low porosity brought by the $Mg_2Si_5Al_4O_3$ system cordierite complex oxide which is a material of low coefficient of thermal expansion, can be obtained.

EMBODIMENT-5

A fifth embodiment of the invention is now explained below. Since the ceramics and the manufacturing method of ceramics of the fifth embodiment are nearly same as those of Embodiment-1, these are omitted here.

In this case, Al and MgO particles are mixed at a weight ratio of 54.3:42.7 representing a mixture of metal particle and inorganic compound in order to prepare a $MgAl_2O_4$ system spinel complex oxide. After mixing this with $Si_2Al_6O_{13}$ system mullite complex oxide particle at a weight ratio of 30:100, the mixture is sintered at a temperature of 1600° C. The characteristics including the thermal conductivity of the obtained ceramics or Sample 24 are shown in Table 6.

TABLE 6

|  | Dimensional change (%) | Porosity (%) | Thermal conductivity (W/k.m.) |
|---|---|---|---|
| Sample-24 | 0.0 | 10 | 4 |
| Ref.-4 | 0.0 | 18 | 4 |

In here, Ref.-4 is a ceramics prepared by mixing only Al particle with the particle of $Si_2Al_6O_{13}$ system mullite complex oxide. As shown in Table 6, beside the extremely small dimensional changes of Sample 24 and Ref.-4, a mullite system ceramics having an excellent thermal conductivity is obtained by developing Sample-24 having a low porosity.

EMBODIMENT-6

A sixth embodiment of the invention is now explained below. Since the ceramics and its manufacturing method of the sixth embodiment are nearly identical with those of Embodiment-1, these are omitted here.

Al and Si particles are mixed at a weight ratio of 74.2 : 25.8 representing a mixture of metal particle and inorganic compound particle in order to prepare a $Si_2Al_6O_{13}$ system mullite complex oxide in this case. After mixing this mixture with $Si_2Al_6O_{13}$ system mullite complex oxide particle at a weight ratio of 30 : 100, the mixture is sintered at a temperature of 1600° C.

The characteristics including the dielectric constant and the thermal conductivity of the obtained ceramics or Sample 25 are shown in Table 7.

TABLE 7

|  | Dimensional change (%) | Porosity (%) | Dielectric constant | Thermal conductivity (W/k · m) |
|---|---|---|---|---|
| Sample-25 | −0.0 | 9 | 6.4 | 3 |
| Ref.-4 | 0.0 | 18 | 7.2 | 1 |

As shown in Table 7, beside the extremely small dimensional changes of Sample 24 and Ref.-4, a mullite system ceramics having an relatively superior thermal conductivity is obtained by developing Sample-25 having a low porosity also.

EMBODIMENT-7

A seventh embodiment of the invention is now explained below. Since the ceramics and its manufacturing method of the seventh embodiment are almost identical with those of Embodiment-1, these are omitted here.

MgO, Al, and Si particles are mixed at a weight ratio of 24.5:32.8:42.7 representing a mixture of metal particle and inorganic compound particle in order to prepare $Mg_2Si_5Al_4O_{18}$ system cordierite complex oxide in this case. After mixing this into $Si_2Al_6O_{15}$ system mullite complex oxide particle at a weight ratio of 40, the mixture is sintered at a temperature of 1430° C.

The characteristics including the coefficient of thermal expansion and the thermal conductivity of the obtained ceramics or Sample 26 are shown in Table 8.

TABLE 8

|  | Dimensional change (%) | Porosity (%) | Coeff. of thermal expansion (x $10^5$/K) | Thermal conductivity |
| --- | --- | --- | --- | --- |
| Sample-26 | 0.1 | 7 | 6.6 | 3 |
| Ref.-4 | 0.0 | 18 | 7.0 | 1 |

As shown in Table 8, though the dimensional changes of Sample 26 and Ref.-4 are very small, a mullite system ceramics having a high thermal conductivity can be obtained by forming a $Mg_2Si_5Al_4O_{18}$ system cordierite complex oxide having low porosity and a low coefficient of thermal expansion such as those of Sample-26.

EMBODIMENT-8

An eighth embodiment of the invention is now explained below. Since the ceramics and its manufacturing method of ceramics of the eight embodiment are nearly identical with those of Embodiment-1, these are omitted here.

MgO, Al, and Si particles are mixed at a weight ratio of 24.5 : 32.8 : 42.7 representing a mixture of metal particle and inorganic compound particle in order to prepare a $Mg_2Si_5Al_4O_{18}$ system cordierite complex oxide in this case. After mixing this into the $Mg_2Si_5Al_4O_{18}$ system cordierite complex oxide particle at a weight ratio of 30, the mixture is sintered at a temperature of 1430° C. The characteristics including the dielectric constant and the coefficient of thermal expansion of the obtained ceramics or Sample 27 are shown in Table 9.

TABLE 9

|  | Dimensional change (%) | Porosity (%) | Dielectric constant | Thermal conductivity (W/m · K) |
| --- | --- | --- | --- | --- |
| Sample-27 | 0.0 | 9 | 5.1 | 2 |
| Ref.-5 | 0.0 | 16 | 7.3 | 0.7 |

In here, Ref.-5 is a ceramics prepared by using only Al particle mixed with the particle of $Mg_2Si_5Al_4O_{18}$ system cordierite complex oxide.

As shown in Table 9, beside the extremely small dimensional changes of Sample 27 and Ref.-5, a cordierite system ceramics having a high thermal conductivity and low dielectric constant is obtained by forming a low porosity ceramics such as those of Sample-27.

EMBODIMENT-9

A ninth embodiment of the invention is now explained below. Since the ceramics and its manufacturing method of the ninth embodiment are nearly identical with those of Embodiment-1, these are omitted here.

Al, MgO, and $Ta_2O_5$ particles are mixed at a weight ratio of 56.2:41.9:1.9 representing a mixture of metal particle and inorganic compound particle in order to prepare a $MgAl_2O_4$ system into spinel complex oxide in this case. After mixing this mixture with alumina particle at a weight ratio of 30:100, the mixture is sintered at a temperature of 1600° C. The characteristics including the dimensional deviation of the obtained ceramics or Sample 28 are shown in Table 10.

TABLE 10

|  | Dimensional change (%) | Porosity (%) | Thermal conductivity (W/m · K) | Dimensional deviation (%) |
| --- | --- | --- | --- | --- |
| Sample-28 | 0.0 | 8 | 18 | 0.4 |
| Ref.-1 | 0.0 | 16 | 10 | 0.7 |

As shown in Table 10, beside the extremely small dimensional changes of Sample 28 and Ref.-1, an alumina system ceramics having a high dimensional accuracy and improved dimensional deviation is obtained by forming a low porosity ceramics such as those of Sample-28 to which $Ta_2O_5$ is added.

EMBODIMENT-10

A tenth embodiment of the invention is now explained below. Since the ceramics and its manufacturing method of the tenth embodiment are nearly identical with those of Embodiment-1, these are omitted here.

Al, Si and $Ta_2O_5$ particles are mixed at a weight ratio of 72.6:25.3:2.1 representing a mixture of metal particle and inorganic compound particle in order to prepare a $Si_2Al_6O_{13}$ system mullite complex oxide in this case. After mixing this mixture with alumina particle at a weight ratio of 30:100, the mixture is sintering at a temperature of 1600° C. The characteristics including the dimensional deviation of the obtained ceramics or Sample 29 are shown in Table 11.

TABLE 11

|  | Dimensional change (%) | Porosity (%) | Dielectric const. (%) | Thermal conduct. (W/m · K) | Dimension deviation (%) |
| --- | --- | --- | --- | --- | --- |
| Samples-29 | −0.1 | 8 | 7.5 | 15 | 0.1 |
| Ref.-2 | 0.0 | 17 | 10.2 | 10 | 0.8 |

As shown in Table 11, beside the extremely small dimensional changes of Sample 29 and Ref.-2, an alumina system ceramics having a high dimensional accuracy and improved dimensional deviation is obtained by forming a $Si_2Al_6O_{13}$ system mullite complex oxide having a low porosity and low dielectric constant ceramics such as those of Sample-29 by adding $Ta_2O_5$ further.

EMBODIMENT-11

An eleventh embodiment of the invention is now explained below. Since the ceramics and its manufacturing method of ceramics of the eleventh embodiment are nearly identical with those of Embodiment-1, these are omitted here.

Al, MgO and $Ta_2O_5$ particles are mixed at a weight ratio of 56.2:41.9:1.9 representing a mixture of metal particle and inorganic compound particle in order to prepare a $MgAl_2O_4$ system spinel complex oxide in this case. After mixing this with the $Si_2Al_6O_{13}$ system mullite particle at a weight ratio of 30:100, the mixture is sintered at a temperature of 1600° C. The characteristics including the dimensional deviation of the obtained ceramics or Sample 30 are shown in Table 12.

TABLE 12

|  | Dimensional change (%) | Porosity (%) | Thermal conduct. (W/m · K) | Dimensional deviation (%) |
|---|---|---|---|---|
| Sample-30 | 0.0 | 9 | 4 | 0.1 |
| Ref.-2 | 0.0 | 18 | 4 | 0.7 |

As shown in Table 12, beside the extremely small dimensional changes of Sample 30 and Ref.-4, a mullite system ceramics having a high dimensional accuracy and improved dimensional deviation is obtained by forming a low porosity ceramics such as that of Sample-30 to which $Ta_2O_5$ is added.

EMBODIMENT-12

A twelfth embodiment of the invention is now explained below. Since the ceramics and its manufacturing method of the twelfth embodiment are nearly identical with those of Embodiment-1, these are omitted here.

Al, Si, and $Ta_2O_5$ particles are mixed at a weight ratio of 72.6:25.3:2.1 representing a mixture of metal particle and inorganic compound particle in order to prepare a $Si_2Al_6O_{13}$ system mullite complex oxide in this case. After mixing this mixture with the $Si_2Al_6O_{13}$ system mullite particle at a weight ratio of 30:100, the mixture is sintered at a temperature of 1600° C. The characteristics including the dimensional deviation of the obtained ceramics or Sample 31 are shown in Table 13.

TABLE 13

|  | Dimensional change (%) | Porosity (%) | Dielect const. | Thermal conduct. (W/m · K) | Dimensional deviation (%) |
|---|---|---|---|---|---|
| Sample-31 | −0.1 | 9 | 6.4 | 4 | 0.3 |
| Ref.-4 | 0.0 | 18 | 7.2 | 1 | 0.8 |

As shown in Table 13, beside the extremely small dimensional changes of Sample 31 and Ref.-4, a mullite system ceramics having a high dimensional accuracy and low dimensional deviation is obtained by forming a low porosity ceramics such as that of Sample-31 to which $Ta_2O_5$ is added.

EMBODIMENT-13

A thirteenth embodiment of the invention is now explained below. Since the ceramics and its manufacturing method of the thirteenth embodiment are nearly identical with those of Embodiment-1, these are omitted here.

Al, MgO, and $GeO_2$ particles are mixed at a weight ratio of 56.7:42.4:0.9 representing a mixture of metal particle and inorganic compound particle in order to prepare a $MgAl_2O_4$ system spinel complex oxide in this case. After mixing this with alumina particle at a weight ratio of 30:100, the mixture is sintered at a temperature of 1600° C.

The characteristics including the dimensional deviation and mechanical strength of the obtained ceramics or Sample 32 are shown in Table 14 together with the characteristics of ceramics obtained by substituting $GeO_2$ with $Ga_2O_3$, $Y_2O_3$, or $Ag_2O$.

TABLE 14

|  | Added inorg. Compound | Dimens. change (%) | Porosity (%) | Thermal cond. (W/m · K) | Dimens deviation (%) | Mechanical Strength (kg/cm$^2$) |
|---|---|---|---|---|---|---|
| Sample-32 | $GeO_2$ | 0.0 | 7 | 18 | 0.3 | 2790 |
| Sample-33 | $Ga_2O_3$ | −0.1 | 9 | 17 | 0.4 | 2750 |
| Sample-34 | $Y_2O_3$ | 0.0 | 10 | 16 | 0.4 | 2740 |
| Sample-35 | $Ag_2O$ | 0.0 | 9 | 18 | 0.4 | 2780 |
| Ref.-1 | — | 0.0 | 16 | 10 | 0.7 | 1800 |

As shown in Table 14, the dimensional changes of Samples 32, 33, 34, 35 and Ref.-1, are extremely small. However, alumina system ceramics having high dimensional accuracies, low dimension deviations, and high mechanical strengths are obtained by preparing ceramics of low porosity such as those of Samples-32, 33, 34, and 35 to which either one of $GeO_2$, $Ga_2O_3$, $Y_2O_3$, or $Ag_2O$ is added.

EMBODIMENT-14

A fourteenth embodiment of the invention is explained below. Since the ceramics and its manufacturing method of the fourteenth embodiment are nearly identical with those of Embodiment-1, these are omitted here.

Al, Si, $GeO_2$ particles are mixed at a weight ratio of 73.1:25.8:1.1 representing a mixture of metal particle and inorganic compound particle in order to prepare $Si_2Al_6O_{13}$ system mullite complex oxide of high dimensional accuracy in this case. After mixing this mixture with alumina particle at a weight ratio of 30:100, the mixture is sintered at a temperature of 1600° C.

The characteristics including the dimensional deviation and mechanical strength of the obtained ceramics or Sample 36 are shown in Table 15 together with the characteristics of ceramics (Samples 37, 38, and 39) obtained by substituting $GeO_2$ with $Ga_2O_3$, $Y_2O_3$, or $Ag_2O$.

TABLE 15

|  | Added inorg. comp. | Dimens. change (%) | Poros. (%) | Dielect. const. (W/m·K) | Thermal cond. (%) | Dimens dev. (%) | Mech. strength (kg/cm²) |
|---|---|---|---|---|---|---|---|
| Sample-36 | $GeO_2$ | −0.1 | 7 | 7.9 | 15 | 0.3 | 2750 |
| Sample-37 | $Ga_2O_3$ | −0.1 | 8 | 7.4 | 15 | 0.4 | 2730 |
| Sample-38 | $Y_2O_3$ | −0.0 | 9 | 7.5 | 14 | 0.4 | 2740 |
| Sample-39 | $Ag_2O$ | −0.0 | 8 | 7.2 | 15 | 0.4 | 2750 |
| Ref.-2 | — | 0.0 | 17 | 10.2 | 10 | 0.8 | 2360 |

As shown in Table 15, the dimensional changes of Samples 36, 37, 38 and 39 which are the embodiments of the invention and Ref.-2, are extremely small. However, an alumina system ceramics having a low dimensional deviation, high dimensional accuracy and a high mechanical strength is obtained by forming a $Si_2Al_6O$ system mullite ceramics which is a ceramics having a relatively low dielectric constant such as those of Samples-36, 37, 38, and 39 to which either one of $GeO_2$, $Ga_2O_3$, $Y_2O_3$, and $Ag_2O$ is added.

EMBODIMENT-15

A fifteenth embodiment of the invention is explained below. Since the ceramics and its manufacturing method of the fifteenth embodiment are nearly identical with those of Embodiment-1, these are omitted here.

Al, MgO, $GeO_2$ particles are mixed together at a weight ratio of 56.7:42.4:0.9 representing a mixture of metal particle and an inorganic compound particle in order to prepare a $MgAl_2O_4$ system spinel complex oxide of high dimensional accuracy in this case. After mixing this with $Si_2Al_6O_{13}$ mullite complex oxide particle at a weight ratio of 30:100, the mixture is sintered at a temperature of 1600° C.

The characteristics including the dimensional deviation and the mechanical strength of the obtained ceramics or Sample 40 are shown in Table 16 together with the characteristics of ceramics (Samples 37, 38, and 39) obtained by substituting $GeO_2$ with $Ga_2O_3$, $Y_2O_3$, or $Ag_2O$.

As shown in Table 16, the dimensional changes of Samples 40, 41, 42, and 43 which are the embodiments of the invention and Ref.-4, are extremely small. However, a mullite system ceramics having a low dimensional deviation, high dimensional accuracy and high mechanical strength is derived from a mullite system ceramics having low porosities and high thermal conductivities such as those of Samples-40, 41, 42, and 43 obtained by adding either one of $GeO_2$, $Ga_2O_3$, $Y_2O_3$, or $Ag_2O$. EMBODIMENT-16

A sixteenth embodiment of the invention is explained below. Since the ceramics and its manufacturing method of ceramics of the sixteenth embodiment are nearly identical with those of Embodiment-1, these are omitted here.

A $Si_2Al_6O_{13}$ system mullite complex oxide is prepared in this case, and Al, Si, $GeO_2$ particles are mixed at a weight ratio of 73.1:25.8:1.1 representing a mixture of metal and inorganic compound in order to obtain a higher dimensional accuracy, and this mixture is mixed with $Si_2Al_6O_{13}$ mullite complex oxide particle at a weight ratio of 30:100, the mixture is then sintered at a temperature of 1600° C.

The characteristics including the dimensional deviation and the mechanical strength of the obtained ceramics or Sample 44 are shown in Table 17 together with the characteristics of ceramics (Samples 45, 46, and 47) obtained by substituting $GeO_2$ with $Ga_2O_3$, $Y_2O_3$, or $Ag_2O$.

TABLE 16

|  | Added inorg. comp. | Dimens. change (%) | Porosity (%) | Thermal cond. (W/m·K) | Dimens devia. (%) | Mechanical strength (kg/cm²) |
|---|---|---|---|---|---|---|
| Sample-40 | $GeO_2$ | 0.0 | 9 | 5 | 0.3 | 2710 |
| Sample-41 | $Ga_2O_3$ | 0.1 | 9 | 5 | 0.4 | 2690 |
| Sample-42 | $Y_2O_3$ | 0.0 | 10 | 5 | 0.4 | 2680 |
| Sample-43 | $Ag_2O$ | 0.0 | 9 | 5 | 0.4 | 2750 |
| Ref.-4 | — | 0.0 | 18 | 1 | 0.7 | 1750 |

TABLE 17

|  | Added inorg. comp. | Dimen. change | Porosity (%) | Dielect. cond. (%) | Thermal cond. (W/m·K) | Dimens. dev. (%) | Mechanical strength (kg/cm²) |
|---|---|---|---|---|---|---|---|
| Sample-44 | $GeO_2$ | −0.1 | 8 | 6.6 | 3 | 0.2 | 2720 |
| Sample-45 | $Ga_2O_3$ | −0.1 | 8 | 6.2 | 3 | 0.3 | 2660 |
| Sample-46 | $Y_2O_3$ | −0.1 | 9 | 6.8 | 3 | 0.4 | 2640 |

TABLE 17-continued

| | Added inorg. comp. | Dimen. change | Porosity (%) | Dielect. cond. (%) | Thermal cond. (W/m · K) | Dimens. dev. (%) | Mechanical strength (kg/cm²) |
|---|---|---|---|---|---|---|---|
| Sample-47 | Ag₂O | −0.1 | 8 | 6.3 | 3 | 0.3 | 2700 |
| Ref.-4 | — | 0.0 | 18 | 7.2 | 1 | 0.8 | 2300 |

As shown in Table 17, the dimensional changes of Samples 44, 45, 46 and 47 which are the embodiments of the invention and Ref.-4, are extremely small. However, a mullite system ceramics having a low dimensional deviation, high dimensional accuracy and a high mechanical strength is derived from mullite system ceramics having low porosities and high thermal conductivities such as those of Samples-44, 45, 46, and 47 obtained by adding either one of $GeO_2$, $Ga_2O_3$, $Y_2O_3$, or $Ag_2O$.

EMBODIMENT-17

A seventeenth embodiment of the invention is explained below. Since the ceramics and its manufacturing method of the seventeenth embodiment are nearly identical with those of Embodiment-1, these are omitted here.

Al and MgO particles and Fe particle suppressing the possible surface elusion of Al during the sintering process are mixed together at a weight ratio of 56.5:42.0:1.5 representing a mixture of metal and inorganic compound in order to obtain a $MgAl_2O_4$ system spinel complex oxide in this case. After this mixture is mixed with alumina particle at a weight rate of 30:100, the mixture is sintered at a temperature of 1600° C.

The characteristics including the surface roughness of the obtained ceramics or Sample 48 are shown in Table 1x together with the characteristics of ceramics (Samples 49–53) obtained by substituting the Fe particle with either one of Cr, Ni, Cu, Zn, or Ti.

As shown in Table 18, the dimensional changes of Samples 48–53 which are the embodiments of the invention and Ref.-1, are extremely small. However, an alumina system ceramics having a low surface roughness is derived from alumina system ceramics having low porosities and relatively high thermal conductivities such as those of Samples-48 53 by adding either one of Fe, Cr, Ni, Cu, Zn, and Ti, or plural of these.

EMBODIMENT-18

An eighteenth embodiment of the invention is now explained below. Since the ceramics and its manufacturing method of the eighteenth embodiment are nearly identical with those of Embodiment-1, these are omitted here.

Al and Si particles, and Fe particle suppressing the possible surface elusion of Al during the sintering process, are mixed together at a weight ratio of 72.8:25.1:2.1 representing a mixture of metal and inorganic compound particles in order to obtain a $Si_2Al_6O_{13}$ system mullite complex oxide in this case. After this mixture is mixed with alumina particle at a weight ratio of 30:100, the mixture is sintered at a temperature of 1600° C. The characteristics including the surface roughness of the obtained ceramics or Sample 54 are shown in Table 19 together with the characteristics of ceramics (Samples 55–59) obtained by substituting the Fe particle with either one of Cr, Ni, Cu, Zn, or Ti.

TABLE 18

| | Added metal particle | Dimens change (%) | Porosity (%) | Thermal conductivity (W/m · K) | Surface roughness (μm) |
|---|---|---|---|---|---|
| Sample-48 | Fe | 0.0 | 7 | 17 | 0.38 |
| Sample-49 | Cr | −0.1 | 9 | 17 | 0.40 |
| Sample-50 | Ni | 0.0 | 10 | 16 | 0.37 |
| Sample-51 | Cu | 0.0 | 9 | 17 | 0.37 |
| Sample-52 | Zn | 0.1 | 10 | 16 | 0.40 |
| Sample-53 | Ti | −0.1 | 9 | 17 | 0.36 |
| Ref.-1 | — | 0.0 | 16 | 10 | 0.56 |

TABLE 19

| | Added metal | Dimens. change (%) | Porosity (%) | Dielec. const. | Thermal conduct (W/m · K) | Surface roughness (μm) |
|---|---|---|---|---|---|---|
| Sample-54 | Fe | −0.1 | 8 | 7.5 | 15 | 0.38 |
| Sample-55 | Cr | 0.0 | 10 | 7.5 | 16 | 0.40 |
| Sample-56 | Ni | 0.1 | 11 | 7.4 | 15 | 0.40 |
| Sample-57 | Cu | 0.1 | 8 | 7.5 | 15 | 0.38 |
| Sample-58 | Zn | −0.1 | 9 | 7.5 | 16 | 0.38 |

TABLE 19-continued

|  | Added metal | Dimens. change (%) | Porosity (%) | Dielec. const. | Thermal conduct (W/m · K) | Surface roughness (μm) |
|---|---|---|---|---|---|---|
| Sample-59 | Ti | 0.0 | 8 | 7.5 | 16 | 0.37 |
| Ref.-1 | — | 0.0 | 16 | 9.8 | 10 | 0.59 |

As shown in Table 19, though the dimensional changes of Samples 54–59 which are the embodiments of the invention, and those of Ref.-1, Ref.-2, and Ref.-3 are extremely small, an alumina system ceramics having a low surface roughness comparable to those of Samples 48–53 is derived from $Si_2Al_6O_{13}$ system mullite complex oxide ceramics. This is a material of low dielectric constant, in which metal oxide particles are produced to lower the porosities thereof by adding either one of Fe, Cr, Ni, Cu, Zn, and Ti, or plural types of these.

EMBODIMENT-19

A nineteenth embodiment of the invention is explained below. Since the ceramics and its manufacturing method of the nineteenth embodiment are nearly identical with those of Embodiment-1, these are omitted here.

MgO, Al and Si particles, and Fe particle introduced to suppress the possible surface elusion of Al during the sintering process, are mixed together at a weight ratio of 24.3, 32.6, 42.4:0.7 representing a mixture of metal and inorganic compound particles in order to obtain a $Mg_2Si_5Al_4O_{18}$ system cordierite complex oxide in this case. After this mixture is mixed with an alumina particle at a weight ratio of 30:100, the mixture is sintered at a temperature of 1430° C.

The characteristics including the surface roughness of the obtained ceramics or Sample 60 are shown in Table 20 together with the characteristics of ceramics (Samples 61–65) obtained by substituting Fe particle with either one of Cr, Ni, Cu, Zn, or Ti.

TABLE 20

|  | Added metal | Dimens. change (%) | Porosity (%) | Thermal expans. (×10⁻⁶/K) | Thermal conduct (W/m · K) | Surface roughness (μm) |
|---|---|---|---|---|---|---|
| Sample-60 | Fe | 0.1 | 8 | 1.1 | 15 | 0.38 |
| Sample-61 | Cr | −0.1 | 10 | 4.2 | 16 | 0.38 |
| Sample-62 | Ni | 0.1 | 9 | 4.2 | 15 | 0.36 |
| Sample-63 | Cu | 0.0 | 10 | 4.0 | 15 | 0.37 |
| Sample-64 | Zn | 0.0 | 9 | 4.2 | 15 | 0.39 |
| Sample-65 | Ti | −0.1 | 8 | 4.1 | 16 | 0.36 |
| Ref.-1 | — | 0.0 | 16 | 7.0 | 10 | 0.59 |

As shown in Table 20, though the dimensional changes of Samples 60–65 which are the embodiments of the invention and Ref.-1, are extremely small, an alumina system ceramics having a low surface roughness is derived from $Mg_2Si_5Al_4O_{18}$ cordierite system complex oxide which is a material of low porosity and low thermal expansion coefficient such as those of Samples 60–65 by adding either one of Fe, Cr, Ni, Cu, Zn, and Ti, or plural of these.

EMBODIMENT-20

A twentieth embodiment of the invention is explained below. Since the ceramics and its manufacturing method of the twentieth embodiment are nearly identical with those of Embodiment-1, these are omitted here.

Al and MgO particles, and Fe particles introduced to suppress the possible surface elusion of Al during the sintering process, are mixed together at a weight ratio of 56.6, 42.0:1.5 representing a mixture of metal and inorganic compound particles in order to obtain a $MgAl_2O_4$ spinel complex oxide particle in this case. After this mixture is mixed with $Si_2Al_6O_{13}$ system mullite complex oxide particle at a weight ratio of 30:100, the mixture is sintered at a temperature of 1600° C.

The characteristics including the surface roughness of the obtained ceramics or Sample 66 are shown in Table 20 together with the characteristics of ceramics (Samples 61–65) obtained by substituting the Fe particle with either one of Cr, Ni, Cu, Zn, or Ti.

TABLE 21

|  | Added metal | Dimens. change (%) | Porosity (%) | Thermal conduct (W/m · K) | Surface roughness (μ) |
|---|---|---|---|---|---|
| Sample-66 | Fe | 0.0 | 10 | 4 | 0.34 |
| Sample-67 | Cr | 0.1 | 11 | 4 | 0.34 |
| Sample-68 | Ni | 0.1 | 10 | 3 | 0.35 |
| Sample-69 | Cu | 0.0 | 9 | 4 | 0.32 |
| Sample-70 | Zn | 0.1 | 10 | 3 | 0.34 |
| Sample-71 | Ti | 0.0 | 9 | 4 | 0.32 |
| Ref.-4 | — | 0.0 | 18 | 1 | 0.49 |

As shown in Table 21, though the dimensional changes of Samples 6–71 which are the embodiments of the invention and Ref.-4, are extremely small, a mullite ceramics having a low surface roughness and high thermal conductivity such as those of Samples 66–71 is obtained by adding either one of Fe, Cr, Ni, Cu, Zn, and Ti, or plural of these.

EMBODIMENT-21

A twenty-first embodiment of the invention is now explained below. Since the ceramics and its manufacturing method of the twenty-first embodiment are nearly identical with those of Embodiment-1, these are omitted here.

Al and Si particles, and Fe particle introduced to suppress the possible surface elusion of Al during the sintering process, are mixed together at a weight ratio of 72.8, 25.1 : 2.1 representing a mixture of metal and inorganic compound particles in order to obtain a $Si_2Al_6O_{13}$ system mullite complex oxide, and this mixture is mixed with $Si_2Al_6O_{13}$ system mullite complex oxide particle at a weight ratio of 30:100. After this, the mixture is sintered at a temperature of 1600° C.

The characteristics including the surface roughness of the obtained ceramics or Sample 72 are shown in Table 22 together with the characteristics of ceramics (Samples 73–77) obtained by substituting the Fe particle with one of Cr, Ni, Cu, Zn, or Ti.

The characteristics including the surface roughness of the obtained ceramics or Sample 78 are shown in Table 23 together with the characteristics of ceramics (Samples 79—83) obtained by substituting the Fe particle with either one of Cr, Ni, Cu, Zn, or Ti.

TABLE 22

|  | Added metal | Dimens. change (%) | Porosity (%) | Dielect. const. | Thermal conduct. (W/m · K) | Surface roughness (μm) |
| --- | --- | --- | --- | --- | --- | --- |
| Sample-72 | Fe | −0.0 | 9 | 6.4 | 3 | 0.34 |
| Sample-73 | Cr | 0.0 | 9 | 6.5 | 4 | 0.34 |
| Sample-74 | Ni | 0.0 | 10 | 6.6 | 3 | 0.35 |
| Sample-75 | Cu | −0.1 | 9 | 6.5 | 3 | 0.33 |
| Sample-76 | Zn | 0.0 | 11 | 6.4 | 4 | 0.34 |
| Sample-77 | Ti | 0.0 | 10 | 6.5 | 3 | 0.32 |
| Ref.-4 | — | 0.0 | 18 | 7.2 | 1 | 0.49 |

TABLE 23

|  | Added metal | Dimens. change (%) | Porosity (%) | Thermal. expans. | Thermal conduct. (W/m · K) | Surface roughness (μm) |
| --- | --- | --- | --- | --- | --- | --- |
| Sample-78 | Fe | 0.0 | 9 | 6.6 | 3 | 0.33 |
| Sample-79 | Cr | 0.1 | 11 | 6.7 | 3 | 0.34 |
| Sample-80 | Ni | 0.1 | 10 | 6.6 | 3 | 0.33 |
| Sample-81 | Cu | 0.0 | 9 | 6.5 | 4 | 0.34 |
| Sample-82 | Zn | 0.1 | 10 | 6.5 | 3 | 0.33 |
| Sample-83 | Ti | 0.0 | 8 | 6.6 | 3 | 0.32 |
| Ref.-4 | — | 0.0 | 18 | 7.0 | 1 | 0.49 |

As shown in Table 22, though the dimensional changes of Samples 72–77 which are the embodiments of the invention and Ref.-4, are extremely small, a mullite ceramics having a low surface roughness and high thermal conductivity such as those of Samples 72–77 is obtained by adding either one of Fe, Cr, Ni, Cu, Zn, and Ti, or plural of these.

EMBODIMENT-22

A twenty-second embodiment of the invention is explained below. Since the ceramics and its manufacturing method of ceramics of the twenty-second embodiment are nearly identical with those of Embodiment-1, these are omitted here.

MgO, Si, Al particles, and Fe particle introduced to suppress the possible surface elusion of Al during the sintering process, are mixed together at a weight ratio of 24.3 : 32.6: 42.4 : 0.7 representing a mixture of metal and inorganic compound particles in order to obtain a $Mg_2Si_5Al_4O_{18}$ system cordierite complex oxide, and this mixture is mixed with $SI_2Al_6O_{13}$ system mullite complex oxide particle at a weight ratio of 40 : 100. The mixture of these is then sintered at a temperature of 1430° C.

As shown in Table 23, though the dimensional changes of Samples 78–83 which are the embodiments of the invention and Ref.-4, are extremely small, a mullite ceramics having a low surface roughness and relatively low thermal expansion coefficients such as those of Samples 78–83 having low porosities is obtained by adding either one of Fe, Cr, Ni, Cu, Zn, and Ti, or plural of these.

EMBODIMENT-23

A twenty-third embodiment of the invention is now explained below. Since the ceramics and its manufacturing method of the twenty-third embodiment are nearly identical with those of Embodiment-1, these are omitted here.

Mgo, Si, and Al particles, and Fe particle introduced to suppress the possible surface elusion of Al during the sintering process, are mixed together at a weight ratio of 24.3 : 32.6 : 42.4 : 0.7 representing a mixture of metal and inorganic compound particles in order to obtain a $Mg_2Si_5Al_4O_{18}$ system cordierite complex oxide, and this mixture is mixed with $Mg_2Si_5Al_4O_{18}$ system cordierite complex oxide particle at a weight ratio of 30 : 100, and the mixture is then sintered at a temperature of 1430° C.

The characteristics including the surface roughness of the obtained ceramics or Sample 84 are shown in Table 24 together with the characteristics of ceramics (Samples 85–89) obtained by substituting Fe particle with either one of Cr, Ni, Cu, Zn, or Ti particles.

TABLE 24

|  | Added metal | Dimens. change (%) | Porosity (%) | Dielect. const. | Thermal conduct. (W/m · K) | Surface roughness (μm) |
| --- | --- | --- | --- | --- | --- | --- |
| Sample-84 | Fe | 0.0 | 9 | 5.1 | 1.9 | 0.36 |
| Sample-85 | Cr | 0.1 | 10 | 5.0 | 2.0 | 0.37 |
| Sample-86 | Ni | 0.1 | 10 | 4.9 | 1.9 | 0.36 |
| Sample-87 | Cu | 0.0 | 9 | 5.0 | 1.8 | 0.35 |
| Sample-88 | Zn | 0.0 | 10 | 5.0 | 2.0 | 0.35 |
| Sample-89 | Ti | 0.0 | 9 | 5.1 | 2.0 | 0.31 |
| Ref.-5 | — | 0.0 | 16 | 7.3 | 0.7 | 0.51 |

As shown in Table 24, though the dimensional changes of Samples 78–83 which are the embodiments of the invention and Ref.5, are extremely small, a cordierite ceramics having low surface roughnesses and relatively low thermal expansion coefficients such as those of Samples 84–89 having a low porosity is obtained by adding either one of Fe, Cr, Ni, Cu, Zn, or Ti particles, or plural of these.

In addition to the above, the dimensional change, porosity, thermal conductivity, thermal expansion coefficient, and the dielectric constant are measured by using the methods described below.

The dimensional change is derived from the ratio of the dimension of unsintered green sheet and the dimension o sintered plate-shaped ceramics, and the minus sign placed in front of the figure indicates a shrinkage.

The porosity of ceramics is derived from the ratio of the apparent volume determined from external dimensions and the pore-excluding volume determined by using a helium dry-densitometer, the thermal conductivity is determined by suing a laser flash method, and the thermal expansion coefficient is derived from the thermal expansions measured in a temperature range from 0° C. to 100° C.

The dielectric constant is derived from the electrostatic capacitance of ceramic-plate of which both surfaces are coated with electrodes, determined by an LCR meter. The mechanical strength is derived from the maximum breakage bending strength determined by using a three-point holding method.

In determining the dimensional deviations, thirty each green-sheets of the same dimension are prepared under an identical condition, and the dimensional changes after sintering are measured. The difference between the maximum and the minimum values is defined as the dimensional deviation.

As above described, a metal oxide produced by a chemical reaction between the metal particle and the externally supplied oxygen when a mixture of at least two types of metal particles or a mixture of metal particles and inorganic compound particle of the invention is sintered. However, this reaction by which the metal is transformed into a metal oxide is accompanied by a volumetric expansion, and by this, the gaps between the grains existed in the mold are gradually filled.

Thus, when at least two types of metal particles are introduced in the ceramics, a complex oxide of these metals is produced, or when the particle of an inorganic compound is introduced, a complex oxide is produced by a chemical reaction took place between the produced metal oxide and the particle of the inorganic compound. Therefore, the pores existing between the grains of inorganic functional material are gradually filled with the grains of these complex oxide.

Thus, the shrinkage of sintered compound can be suppressed at its minimum degree, and the pores in the sintered body can also be minimized maintaining the essential characteristics of inorganic functional material, so that the dimension of the sintered body is controllable precisely.

Furthermore, not only the above-mentioned characteristics can be obtained, but the functions of complex compound produced by sintering can be obtained in addition to the original functions of inorganic functional material.

Moreover, by employing the above-mentioned manufacturing method, a sintering process possible in an environment of oxygen containing atmosphere can be employed, so that the invented ceramics of high-degree functions can be manufactured at a low manufacturing cost.

While the invention has been described with reference to particular embodiments and examples, the invention is not intended to be limited thereto. Other embodiments and modifications can be made thereto by those skilled in the art without departing from the spirit and scope of the invention described above and claimed below.

What is claimed is:

1. A ceramic having a minimized porosity and sintering shrinkage, comprising:
    (a) grains of alumina, and
    (b) grains of $Mg_2Al_4SiO_{10}$ distributed among said grains of alumina, said grains of $Mg_2Al_4SiO_{10}$ being produced by an oxidation reaction at a sintering process of a mixture including at least two different metallic particles, or a mixture including a metallic particle and an inorganic compound particle,
    wherein said grains of $Mg_2Al_4SiO_{10}$ are expanded during said sintering process, and a gap located among said grains of alumina is filled with said grains of $Mg_2Al_4SiO_{10}$.

2. The ceramic of claim 1, wherein said mixture comprises Al, Si, and $MgCO_3$ particles.

3. The ceramic of claim 1, wherein said mixture comprises Al, Si, and MgO particles.

4. The ceramic of claim 1, wherein said mixture comprises Al, $SiO_2$, and MgO particles.

5. A ceramic having a minimized porosity and sintering shrinkage, comprising:
    (a) grains of alumina, and
    (b) grains of $Mg_2Si_5Al_4O_{18}$ distributed among said grains of alumina, said grains of $Mg_2Si_5Al_4O_{18}$ being produced by an oxidation reaction at a sintering of a mixture of Al, Si and MgO particles;
    wherein said grains of $Mg_2Si_5Al_4O_{18}$ are expanded during said sintering, and a gap located among said grains of alumina is filled with said grains of $Mg_2i_5Al_4O_{18}$.

6. A ceramic having a minimized porosity and sintering shrinkage, comprising:

(a) grains of alumina, and (b) grains of $MgAl_2O_4$ distributed among said grains of alumina, said grains of $MgAl_2O_4$ being produced by an oxidation reaction at a sintering of a mixture of Al, MgO, and $Ta_2O_5$ particles;

wherein said grains of $MgAl_2O_4$ are expanded during said sintering, and a gap located among said grains of alumina is filled with said grains of $MgAl_2O_4$.

7. A ceramic having a minimized porosity and sintering shrinkage, comprising:

(a) grains of alumina, and (b) grains of $Si_2Al_6O_{13}$ distributed among said grains of alumina, said grains of $Si_2Al_6O_{13}$ being produced by an oxidation reaction at a sintering of a mixture of Al, Si and $Ta_2O_5$ particles;

wherein said grains of $Si_2Al_6O_{13}$ are expanded during said sintering, and a gap located among said grains of alumina is filled with said grains of $Si_2Al_6O_{13}$.

8. A ceramic having a minimized porosity and sintering shrinkage, comprising:

(a) grains of alumina, and (b) grains of $MgAl_2O_4$ distributed among said grains of alumina, said grains of $MgAl_2O_4$ being produced by an oxidation reaction at a sintering of a mixture of Al, MgO and at least one particle selected from the group consisting of $GeO_2$, $Ge_2O_3$, $Y_2O_3$ and $Ag_2O$ particles;

wherein said grains of $MgAl_2O_4$ are expanded during said sintering, and a gap located among said grains of alumina is filled with said grains of $MgAl_2O_4$.

9. A ceramic having a minimized porosity and sintering shrinkage, comprising:

(a) grains of alumina, and (b) grains of $Mg_2Si_5Al_4O_{18}$ distributed among said grains of alumina, said grains of $Mg_2Si_5Al_4O_{18}$ being produced by an oxidation reaction at a sintering of a mixture of Al, Si, MgO and at least one particle selected from the group consisting of Fe, Cr, Zn, Ni, Ti and Cu particles;

wherein said grains of $Mg_2Si_5Al_4O_{18}$ are expanded during said sintering, and a gap located among said grains of alumina is filled with said grains of $Mg_2Si_5Al_4O_{18}$.

* * * * *